June 13, 1944.  M. F. WEIDA  2,351,466
HEATING ELEMENT SUPPORT FOR SANDWICH TOASTERS
Filed Nov. 10, 1941 2 Sheets-Sheet 1
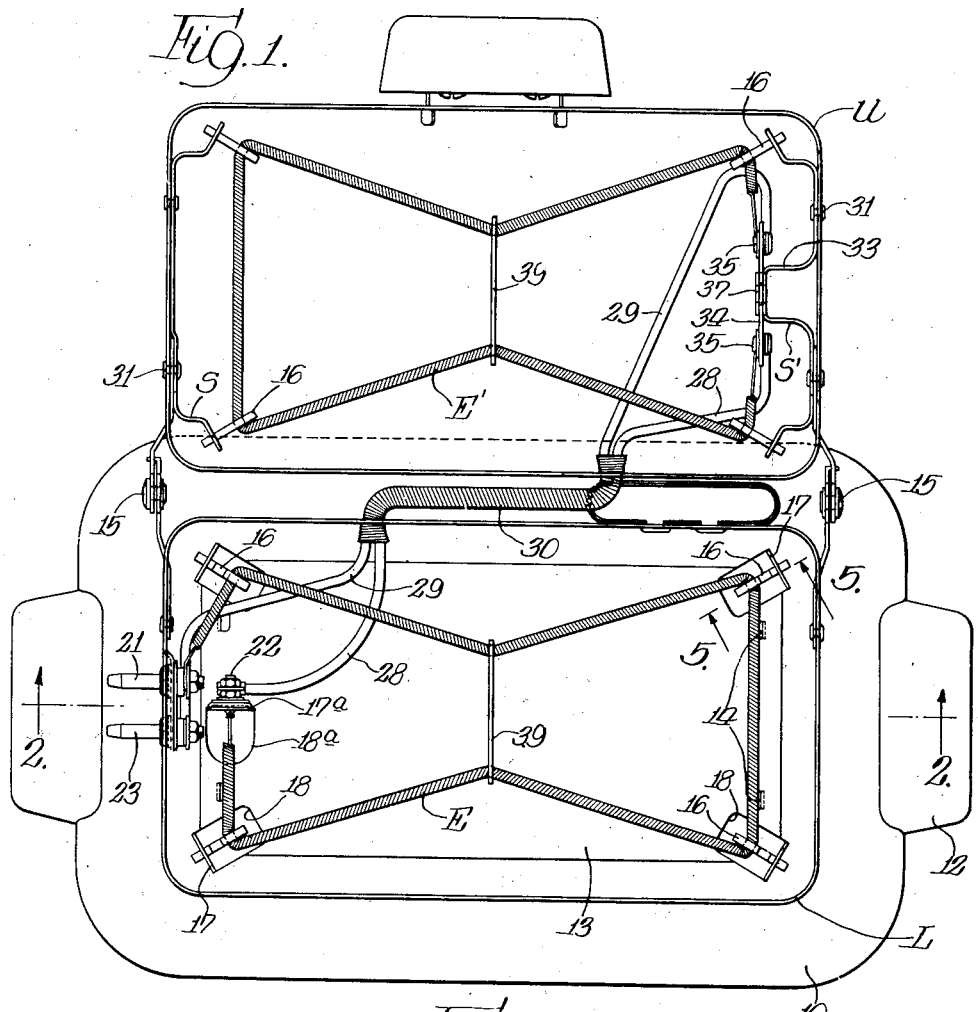
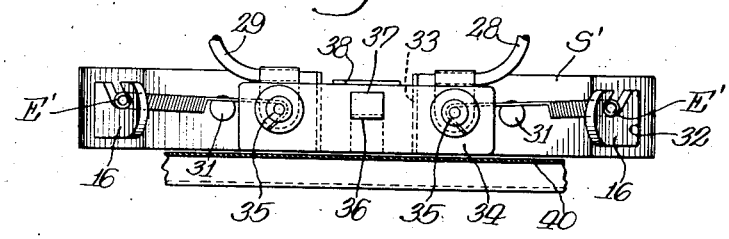
INVENTOR.
Millard F. Weida.
BY Bair & Freeman
Atty's

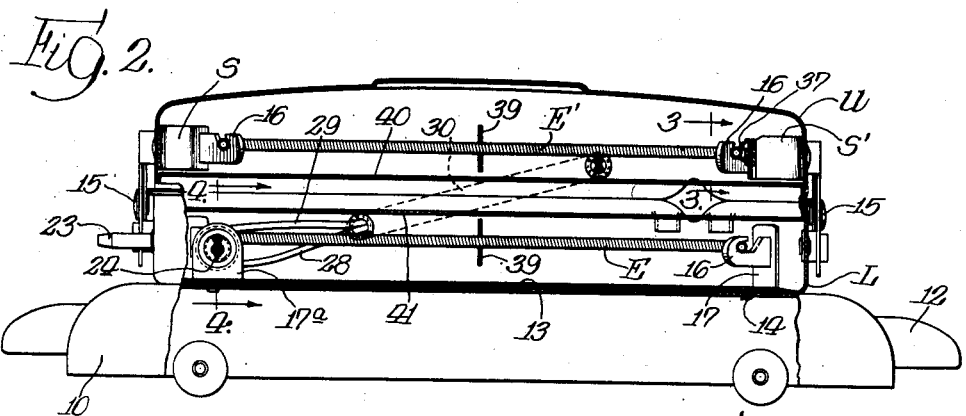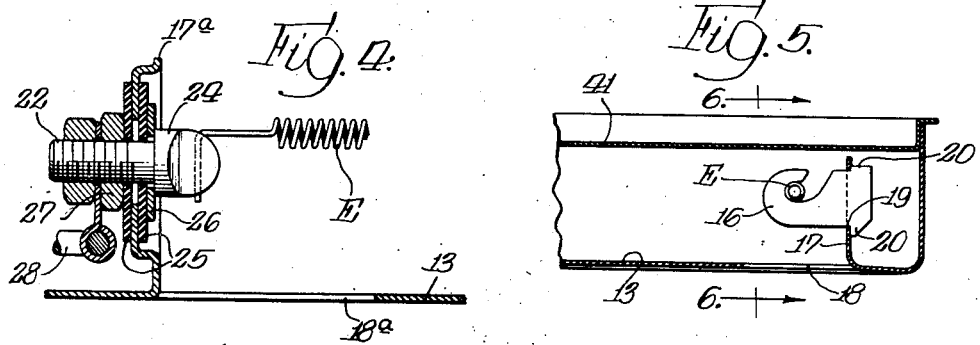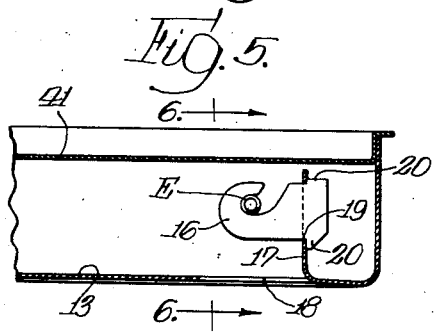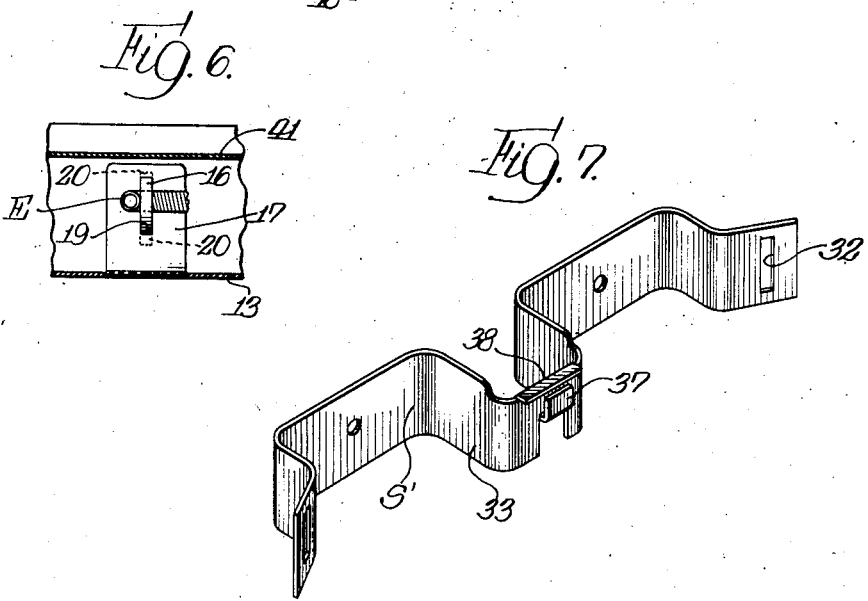

Patented June 13, 1944

2,351,466

UNITED STATES PATENT OFFICE 2,351,466

HEATING ELEMENT SUPPORT FOR SANDWICH TOASTERS

Millard F. Weida, St. Louis, Mo., assignor to Knapp-Monarch Company, St. Louis, Mo., a corporation of Missouri Application November 10, 1941, Serial No. 418,473

3 Claims. (Cl. 219—19)

This invention relates to an inexpensive means for supporting heating elements within the casings of electrical appliances.

One object of the invention is to provide supports which minimize material and which may be formed and assembled with a minimum of labor.

A further object is to provide heating element supports particularly adapted for electrical appliances, such as sandwich toasters or the like, having lower and upper casings, the supports in the lower casing being formed of the casing material and those in the upper casing being simple formations of strap elements for supporting insulating elements which, in turn, support the heating element.

Still a further object is to provide terminal supporting means for the ends of the heating element and connecting wires extending between the lower and upper casings of the sandwich toaster, the lower casing being provided with terminal prongs with which the electric supply circuit may be connected.

With these and other objects in view, my invention with respect to its features which I believe to be novel and patentable will be pointed out in the claims appended hereto. For a better detailed understanding of the invention and further objects relating to details of economy of my invention, reference is made to the following description and to the accompanying drawings, wherein such further objects will definitely appear, and in which Figure 1 is a plan view of a sandwich toaster embodying my invention showing the toaster grids removed in order to illustrate the heating elements and their supports;

Figure 2 is a sectional view on the line 2—2 of Figure 1;

Figure 3 is an enlarged sectional view on the line 3—3 of Figure 2;

Figure 4 is an enlarged sectional view on the line 4—4 of Figure 2 showing a terminal support in the lower casing;

Figure 5 is an enlarged sectional view on the line 5—5 of Figure 1, showing a supporting ear bent up from the bottom wall of the lower casing;

Figure 6 is a sectional view thereof on the line 6—6 of Figure 5, and

Figure 7 is an enlarged perspective view of one of the supporting straps in the upper casing.

On the accompanying drawings, I have used the reference numeral 10 to indicate a sheet metal base, and 12, supporting handles at the ends thereof. The base 10 has mounted thereon a lower casing L and an upper casing U. The casing L has a bottom wall 13 secured to the base member 10 by ears 14 cut therefrom and projected downwardly through the upper wall of the base 10 and then bent over, as illustrated in Figure 2. The upper casing U is hinged to the lower casing L by suitable hinges indicated at 15.

Heating elements E and E' are provided in the lower casing L and the upper casing U, respectively. My present invention relates particularly to the supporting means for these heating elements. The usual supporting hooks 16 of insulating material are provided, and for supporting these hooks, in the lower casing L I provide perforated ears 17. The ears 17 are cut from the bottom wall 13 of the lower casing L, the opening left thereby being indicated at 18. The perforations of the ears 17 are indicated at 19 and the insulating supporting hooks 16 are thrust through these openings. To limit their movement through the openings they are provided with shoulders 20, as shown in Figure 5.

Four of the perforated ears 17 are provided for the heating element E. The ends of the heating element are connected with and supported by a terminal prong 21 and a terminal screw 22. The terminal prong 21 and companion prong 23 are supported in the usual manner at one end of the lower casing L and suitably insulated with respect thereto in a manner similar to that shown in Figure 4. Figure 4 illustrates the terminal screw 22 which has a slotted head 24 in which one end of the heating element E is connected by squeezing the head to close the slot. Insulating shoulders 25 are provided under a washer 26 and a nut 27 to insulate the screw 22 with respect to an ear 17ᵃ. The ear 17ᵃ, like the ears 17, is formed from the bottom wall 13 of the base 10, leaving an opening 18ᵃ therein.

The other end of the heating element E is connected with the prong 21 and a pair of wires 28 and 29 extend from the terminal screw 22 and the prong 23 through a coil spring 30 and into the upper casing U.

In the upper casing, supporting hooks 16 are supported by a pair of straps S and S'. These straps are secured to the ends of the casing U by rivets 31. Each end of each strap is perforated, as indicated at 32, to receive the supporting hook 16 in substantially the same manner as described in connection with Figure 5 for the ears 17. The strap S' differs from the strap S in having a central portion 33 bent away from its adjacent end wall of the upper casing to provide a support for a strap of insulation 34 carrying elements 35 at its ends. The insulating strap 34 has a rectangular opening 36 to receive a tongue 37 of the strap S' which holds the insulating strap in position. A flange 38 of the strap S' holds the insulating strap 34 in properly aligned position. The terminals 35 are in the form of rivets connected with the wires 28 and 29 and with the ends of the heating element E'. Both heating elements E and E' are supported at their centers by links 39 of insulating material which place the heating elements under tension to prevent sagging. The elements 39 are of substantial width so as to space the centers of the heating elements from the bottom wall 13 and an upper grid 40, respectively, if they do sag. The grid 40 closes the open lower side of the casing U, while a similar grid 41 closes the open upper side of the lower casing L.

From the foregoing disclosure, it is obvious that I have provided heating element supports which minimize the number of elements required for support. In the lower casing L, the material of the bottom 13 is utilized to form supporting ears 17 and 17a. In the upper casing C where openings such as 18 and 18a would be objectionable, simply formed straps S and S' are used instead of the ears 17 and 17a. The strap S' is so designed as to efficiently support the terminals 35 and space them from the end of the upper casing U.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. Means for supporting the heating element in a sandwich toaster or the like having a casing comprising straps within said casing adjacent and secured to the ends thereof, supporting hooks of insulating material supported thereby, a terminal support secured to one of said straps, said strap being humped at said terminal support to space the support from the adjacent end of said casing, and a heating element in said casing supported at its ends by said terminal support and intermediate its ends by said supporting hooks, the stretches of said heating element along the sides of said casing being bowed toward each other, and connectors of insulation for connecting said bowed parts together in spaced relation.

2. Means for supporting the heating element in a sandwich toaster or the like having a casing comprising straps within said casing adjacent and secured to the ends thereof at points spaced from the ends of the straps, said ends being perforated, supporting elements of insulating material in said perforations, a terminal support secured to the center of one of said straps, said ends of said strap and said center of said one of said straps being bent to positions spaced from said casing ends, and a heating element in said casing suported by said supporting elements and said terminal support.

3. In an electrical appliance, a casing member, means for supporting a heating element therein comprising straps secured flatwise against the ends of said casing, insulating elements supported by the ends of said straps, a heating element supported by the insulating elements, the center portion of one of said straps being bent away from said casing, and a terminal support against said center portion, said terminal support having a perforation therein adjacent the center thereof, said center portion of said one of said straps having a flange and a tongue to coact respectively with the edge and said perforation of said terminal support to retain the support rigidly on the center portion of said strap.

MILLARD F. WEIDA.